No. 852,438. PATENTED MAY 7, 1907.
R. LAMB.
PROCESS FOR THE EXTRACTION OF METALS FROM THEIR ORES.
APPLICATION FILED DEC. 22, 1902.
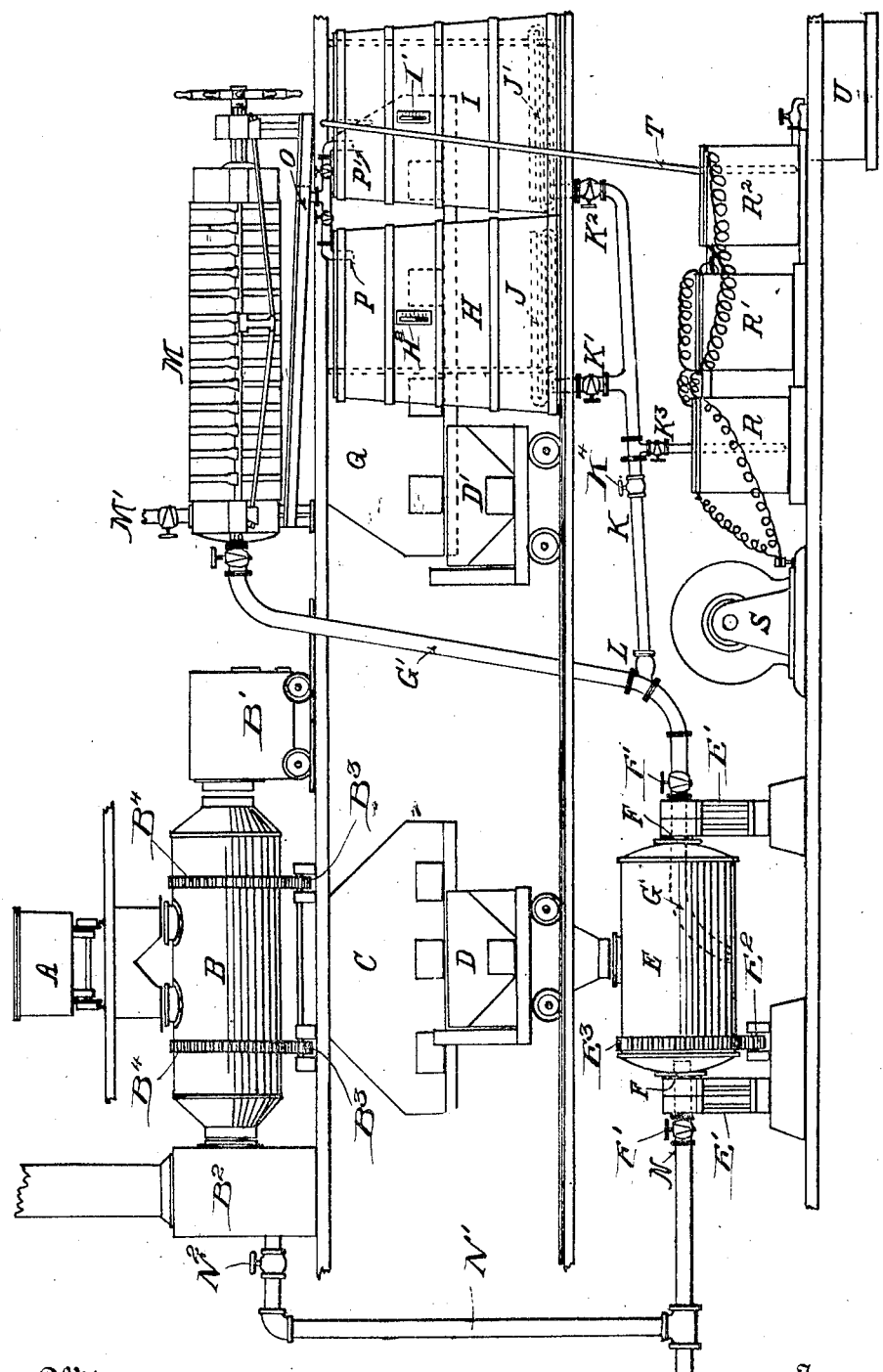

UNITED STATES PATENT OFFICE.

RICHARD LAMB, OF NEW YORK, N. Y.

PROCESS FOR THE EXTRACTION OF METALS FROM THEIR ORES.

No. 852,438.  Specification of Letters Patent.  Patented May 7, 1907.

Application filed December 22, 1902. Serial No. 136,106.

*To all whom it may concern:*

Be it known that I, RICHARD LAMB, residing at New York, in the county of New York and State of New York, have invented certain new and useful Improvements in Processes for the Extraction of Metals from Their Ores, of which the following is a full, clear, and exact description, such as will enable others skilled in the art to which it appertains to make and use the same.

This invention relates to a process for the extraction of metals from their ores. Its object is to provide a process for the extraction of metals from their ores, particularly adapted for the extraction of concentration of copper, which shall be of improved efficiency as compared with the processes now in use, and which shall be more economical, both from the standpoint of materials used and time consumed in carrying out the various steps of the process.

For the attainment of these and other objects, which will appear hereinafter, the process consists in the various essential and supplemental steps hereinafter set forth, and the novel features of which will be specifically pointed out in the claims.

This process is especially adapted for the extraction of copper from its ores, and it will be herein described as in connection with a copper bearing ore, but it will be obvious that it is not necessarliy limited thereto.

In general, the process consists in agitating the ore, previously pulverized and roasted if necessary, in connection with a suitable solvent, forcing the solution together with the insoluble matter, into a filtering press, removing the solution from the insoluble matter and extracting the metal from the solution by electrolysis or otherwise.

I do not use the terms "solvent" and "solution" herein in a limiting sense, as it is not necessary for the purposes of this specification to distinguish between solubility and miscibility.

The various steps of the process, both those essential, and those advantageous only under certain conditions, may be best understood by tracing them in connection with the mechanisms illustrated in the drawing, which shows a plant or series of devices adapted for the carrying out of the process.

In the drawing, A represents a car by which ore may be conveyed to a rotatable roasting furnace B, having a movable heat-supplying member B¹ and a draft apparatus B², with a suitable stack. In position to receive the ore dumped from the roaster B is a bin C. From this bin the ore is discharged into a car D, in connection with which scales may be provided, for weighing the roasted ore. In position to receive the ore from the car D is a rotatable cylinder E, which is used for agitating or mixing the ore in connection with a suitable liquid. This cylinder has trunnions journaled in standards E¹, and it is adapted to be rotated by a suitably driven driven spur gear E², meshing with an annular rack E³ on the barrel of the cylinder. Through stuffing boxes F F, pass pipes N and G communicating with the interior of the cylinder E. Suitable valves are provided for controlling the openings in these pipes adjacent the cylinder, as shown at F¹ F¹. The pipe N communicates with the interior of the cylinder, preferably in the vicinity of the axis thereof, while the pipe G is bent downwardly so that its mouth opens adjacent the lower part of the cylinder, as shown in dotted lines.

It will be understood, of course, that the cylinder is adapted to rotate independently of the communicating pipes N and G. A branch pipe N¹ extends from pipe N and communicates with the draft apparatus B², a suitable controlling valve N² being provided in connection therewith adjacent to said draft apparatus. The pipe G is connected by pipe G¹ with a filter press M of usual construction. Below the filter press is a trough O which communicates, by means of pipes P P¹, with tanks H and I, through which tanks pass the heating coils J J¹. A bin Q is in position to receive the solid matter removed from the filter press M, and such matter may be discharged from this bin into a car D¹, from which it may be conveyed back to the mixer E. A pipe K connects the pipe G¹, from a point L adjacent the agitator E, with the tanks H and I, by suitable branches controlled by valves K¹ and K². This pipe also communicates, by means of a suitable branch, controlled by the valve K³, with a series of electrolytic cells R, R¹, R², to which current is supplied from a generator S. A valve K⁴ is provided in the pipe K between the point L where said pipe communicates with the pipe G¹ and the point where the branch pipe takes off for the electrolytic cells. The electrolyte may be discharged from the electrolytic cells into a vat U.

It will be understood that the mechanisms described above may be given any suitable proportion and arrangement of parts, and constructed of any suitable material. The connections and relative positions of the various elements may be varied indefinitely, and the parts which are intended to resist pressure or to be used in connection with acids should be made pressure-proof and acid-proof.

In extracting copper from its ores by my process, the roasting step is not always an essential one. When the ore is in a form to be dissolved by dilute sulfuric acid, as in the case of the oxids and carbonates of copper, it may be fed directly to the agitator. When, however, there is an excess of alkali in the gangue, the oxid and carbonate ores are preferably roasted with sulfid ore. This reduces the ore to the sulfate. It is then dissolved in hot water instead of in dilute sulfuric acid. In the case of sulfid ores, the ore is roasted, preferably in a roaster or furnace, such that the temperature can be easily regulated in order to prevent the reduction of the metallic ores to a metallic state, and to change the iron to an oxid of iron, which is practically insoluble in dilute sulfuric acid, thereby also changing the sulfids to sulfates.

The process may now be traced more specifically in connection with the mechanisms illustrated. The ore is first crushed, then conveyed to the roaster B, which, as shown, is provided with means for easily regulating the temperature, as by the movable heat supplying member $B^1$. It is preferable that the ore should not be limited to a fixed time in passing through the roaster, but the furnace should be designed to retain the charge until it is shown by tests to be sufficiently roasted, although a type of furnace, in which the ore is conveyed in a continuous stream, or subjected for a fixed time to the action of the heat, may be employed in some cases. The copper ore having been exposed to the action of a sufficient degree of heat in the furnace for a sufficient length of time, the moisture will be removed therefrom, and the iron will be changed to an oxid of iron which is practically insoluble in dilute sulfuric acid. The degree of heat necessary to effect this change varies within wide limits, but it may advantageously be about 700 degrees. It is desirable that the ordinary oxid of iron in the ore should be changed to an oxid of iron insoluble in dilute sulfuric acid, because thereby less of the acid will be consumed in the further steps of the process. Where the gangue contains much alkali, care should be taken to so proportion the roasting so as to form a minimum amount of oxid of copper. Less care may be exercised where the iron oxids and alkali are not excessive, for if part of the ore is roasted until it becomes oxid of copper, it can, in the further steps of my process, be economically treated with dilute sulfuric acid, which acid will later assist the process by rendering acidulous the hot water electrolyte.

When the copper ore in the roaster has been sufficiently roasted, whether to the extent necessary to reduce it to the sulfate or to the oxid, or any other desired form, it is dumped from the furnace, which may be rotated by means of the actuating gears $B^3$ and annular racks $B^4$, into the bin C, thence, if desired, to the weighing car D, and thence into the mixer or agitator E. After the charge of roasted ore has been placed in the mixer, hot water from the tank H, is run into the mixer by opening the valves $K^1$, $K^4$ and $F^1$, the valves $K^2$ and $K^3$ being closed. If desired, a suitable gage $H^1$ may be provided in connection with the tank H, to indicate the amount of hot water which is run into the mixture. The mixer is then closed and rotated until the hot water has thoroughly dissolved all the sulfate of copper. Then, steam or compressed air is admitted from a suitable source of supply through the pipe N, the branch $N^1$ connected with the draft apparatus being closed by the valve $N^2$. The connections between the mixer and the filter press having been opened and the branch connections to the tanks having been closed, the solution and the solid matter are thus pneumatically forced from the mixer through the pipe G and into the filter press M. The mixer is preferably kept rotating while under pressure, in order to hold the solid matter in suspension or solution, and to prevent its settling to the lowest point of the mixer. By the action of the filter press, the hot water solution of copper is run into the trough O. Then the valve in the pipe P is opened and the solution is run into the tank H. The filter press is now opened and the solid cakes, which may be further treated, if desired, by continuing the supply of steam or compressed air through the pipe $M^1$ after the liquid has been pressed out, are dumped into the bin Q and tested for value. If enough oxid of copper is found therein, the ore is emptied from the bin Q into the car $D^1$ and conveyed back to the mixer. Dilute sulfuric acid is then drawn from the tank I into the mixer by opening the proper valves. A gage $I^1$ on this tank may be used to indicate the supply of acid, if desired. When the proper proportion of acid to ore has been run into the mixer, the connections are closed and the mixer rotated. After thoroughly dissolving the oxid of copper, the solution and solid matter are again forced under pressure into the filter press, the solution removed therefrom, and this solution is run into the tank I by opening the valve in the pipe $P^1$ between said tank and the trough O.

In the case of the hot water solution, the same liquid may be run through several charges of ore, depending upon the amount of copper which the water will take into solution. As the sulfuric acid will take up only a definite amount of copper, it must, when saturated, be depleted by electrolytic action before it can be used to leach more copper. There is also an advantage herein in that a richer electrolyte admits the effective use of a greater current through the cells, and, accordingly, the electrolytic step of the process can be carried out in less time.

The action of the coils J and $J^1$ in supplying heat, both for warming the contents of the tanks, and for concentrating said contents by evaporation, will be readily understood. The leached ore dumped into the bin Q, when it is found to contain nothing more of value, so far as the present process is concerned, may be disposed of in any desired way.

The electrolytic cells are supplied with electrolyte in the shape of the solutions of copper sulfate in hot water, and of copper in sulfuric acid, from the tanks H and I respectively by opening the valves $K^1$, $K^2$ and $K^3$, and closing the valve $K^4$. The degree to which the valves $K^1$ and $K^2$ are opened respectively depends upon the relative amounts of the two solutions which it is desired to deliver to the electrolytic cells. The anodes and cathodes of the cells may be of any material that will withstand the sulfuric acid under the action of the current. Lead answers this purpose.

When the copper has been extracted, the electrolyte may be led from the electrolytic cells into the tank I through the pipe T. When the electrolyte has become too foul for further use in the process, it is run into the tank U, where it is boiled down with steam and treated with scrap iron for cement copper or with lead strips hung in the acid upon which crystals of copper sulfate form. These lead strips are cleaned and used again and the copper sulfate may be disposed of as desired.

As a subsidiary step in this process, sulfurous acid may be prepared by roasting pyritic ore or sulfur, at some suitable point, as by causing the hot air from the furnace to pass over said sulfur or ore before passing out of the stack, and carrying the gas evolved thereby, which is sulfurous acid gas, in any suitable way, through the pipes $N^1$ and N into the mixer E when said mixture is charged with ore and water. This will form sulfurous acid which will leach the ore in the mixer. When sulfurous acid is supplied in this way, and in connection with certain ores, the sulfuric acid step of the main processes outlined above may be dispensed with. So far as this process is concerned, it is immaterial whether the passing of the gas from roasting sulfur into the mixer is said to form sulfurous or sulfuric acid. Depending upon the amount of water present and the condition of the reaction, both acids might be present to some extent. Under some conditions the use of sulfurous acid gas with water, preferably hot water, in the mixer may be the most desirable manner of practicing this invention. The hot water will dissolve the sulfate and a certain amount of sulfurous and sulfuric acid will be formed which will dissolve the oxid of copper, thereby obtaining a rich electrolyte, which has removed practically all the copper from the ore and which may be led directly to the electrolytic cells after separation from the insoluble matter. This combines the hot water and acid step in a single operation.

The fumes of sulfurous acid gas generated in roasting the ores in the main process, when those ores contain sulfur, may also be used to supply sulufrous acid for the mixer. It will be obvious, likewise, that the sulfurous acid gas obtained in this way, as well as that obtained independently, as above described, may be led directly to the tank I, or into the electrolytic vats, there used to form sulfurous acid, and said acid used instead of the sulfuric acid in the general process as outlined.

Having described my invention, what I claim as new and desire to secure by Letters Patent, is:—

1. The process of extracting copper from its ores, consisting in reducing said ores to granular condition, then placing said ores within a closed leaching vessel, then introducing water and placing liquid $SO_2$ into said vessel whereby free sulfurous acid will be formed and a solution of the copper thereby effected, then pneumatically separating said solution from the residue, then washing said residue and preserving said washings, then subjecting said solution as an electrolyte to a current of relatively low density between insoluble anodes and cathodes, maintaining an excess of sulfurous acid in said electrolyte whereby the same will be oxidized to form free sulfuric acid, then re-employing said electrolyte depleted from copper for leaching fresh charges of ore.

2. The process of extracting copper from its ores, consisting in reducing said ores to a granular condition, then placing said ores within a closed leaching vessel, then introducing a quantity of acidulated solution depleted from copper by electrolysis, then forcing $SO_2$ into said vessel whereby free sulfurous acid will be formed and a further solution of the copper effected, then separating said solution from the residue, then subjecting said solution as an electrolyte to a current of relatively low density between insoluble anodes and cathodes whereby metallic copper will be deposited and the solution will regain its acidity, and then re-employing said solution for leaching fresh charges of ore.

3. The process of extracting copper from its ores, consisting in reducing the ores to a granular condition, then roasting said ores at a relatively low temperature to convert the iron in said ores into an insoluble oxid and to convert the copper into soluble form, then placing said roasted ore within a closed leaching vessel, then introducing water to dissolve the copper salts soluble therein, then forcing liquid $SO_2$ into said vessel to produce free sulfurous acid whereby the hitherto undissolved copper will be taken into solution, then pneumatically separating said solution from the residue, then submitting the same as an electrolyte to a current of relatively low density between insoluble anodes and cathodes, maintaining an excess of sulfurous acid whereby the copper will be deposited in metallic form and free sulfuric acid formed, and then re-employing said electrolyte for leaching fresh charges of ore.

4. The process of extracting copper from its ores, consisting in reducing said ores to a granular condition, then placing said ores within a closed leaching vessel, then introducing water and forcing compressed $SO_2$ into said vessel, whereby sulfurous acid will be formed and a solution of the copper in the said ores effected, then separating said solution from the residue, then subjecting said solution containing an excess of sulfurous acid as an electrolyte to a current of relatively low density between insoluble anodes and cathodes, whereby metallic copper will be deposited and the solution regain acidity and be adapted for leaching fresh charges of ore.

In testimony whereof I affix my signature, in the presence of two witnesses.

RICHARD LAMB.

Witnesses:
 H. M. SEAMANS,
 I. C. DELANEY.